(12) United States Patent
Geerse et al.

(10) Patent No.: US 8,245,736 B2
(45) Date of Patent: Aug. 21, 2012

(54) POWDER PACKAGING

(75) Inventors: Maarten Christiaan Geerse, Den Haag (NL); Alexander Josephus Maricus Van Puijenbroek, Den Bosch (NL)

(73) Assignee: N.V. Nutricia, Zoetermeer (NL)

( * ) Notice: Subject to any disclaimer, the term of this patent is extended or adjusted under 35 U.S.C. 154(b) by 0 days.

(21) Appl. No.: 13/266,615

(22) PCT Filed: Apr. 28, 2009

(86) PCT No.: PCT/NL2009/050230
§ 371 (c)(1),
(2), (4) Date: Dec. 5, 2011

(87) PCT Pub. No.: WO2010/126354
PCT Pub. Date: Nov. 4, 2010

(65) Prior Publication Data
US 2012/0060968 A1 Mar. 15, 2012

(51) Int. Cl.
*B65B 1/04* (2006.01)
(52) U.S. Cl. ........... 141/2; 141/18; 141/112; 141/311 R; 222/207; 222/344; 222/365
(58) Field of Classification Search .............. 141/18, 141/22, 100, 112, 301, 381, 108, 109, 311 R, 141/329, 330, 344, 2; 222/386, 365, 207; 222/510, 82, 129, 344; 206/219, 222
See application file for complete search history.

(56) References Cited

U.S. PATENT DOCUMENTS

| | | | |
|---|---|---|---|
| 427,165 A * | 5/1890 | Fickett | 222/230 |
| 1,449,571 A * | 3/1923 | Younger | 222/246 |
| 2,034,067 A | 3/1936 | Stone | |
| 3,556,174 A | 1/1971 | Gibble et al. | |
| 3,624,787 A | 11/1971 | Newman | |
| 4,088,242 A | 5/1978 | Schellenberg | |
| 4,233,325 A | 11/1980 | Slangan et al. | |
| 4,365,457 A | 12/1982 | Schellenberg | |
| 4,869,047 A | 9/1989 | Nishiguchi et al. | |
| 4,870,800 A | 10/1989 | Kasai | |
| 4,990,345 A | 2/1991 | Webb | |
| 5,009,310 A | 4/1991 | Finney | |
| 5,090,572 A | 2/1992 | DeRoseau | |
| 5,219,087 A | 6/1993 | Christensson | |
| 5,259,537 A | 11/1993 | Beers et al. | |
| 5,577,370 A | 11/1996 | Pajak et al. | |
| 5,617,705 A | 4/1997 | Sanfilippo et al. | |
| 5,705,212 A | 1/1998 | Atkinson | |

(Continued)

FOREIGN PATENT DOCUMENTS

CH 381606 10/1964

(Continued)

*Primary Examiner* — Timothy L Maust
*Assistant Examiner* — Timothy Kelly
(74) *Attorney, Agent, or Firm* — The Webb Law Firm

(57) ABSTRACT

A powder packaging includes space for containing powder, an outlet opening for the powder, and a dosing device positioned on the outlet opening, the powder dosing device including a dosing body having a first closing part, a second closing part and a dosing chamber between the closing parts. The dosing body is movable between a filling position in which the dosing chamber is accessible for powder in the powder containing space and the second closing part closes off the outlet opening, and a dosing position in which the first closing part closes off the outlet opening and the dosing chamber allows powder to leave the dosing chamber and thus to exit the powder containing space.

17 Claims, 5 Drawing Sheets

U.S. PATENT DOCUMENTS

| | | | |
|---|---|---|---|
| 5,715,967 A | 2/1998 | Pajak et al. | |
| 6,058,682 A | 5/2000 | Pajak et al. | |
| 6,604,645 B1 | 8/2003 | Vaupotic | |
| 7,228,993 B2 | 6/2007 | Yang | |
| 8,136,701 B2 * | 3/2012 | Veltrop et al. | 222/207 |
| 2004/0178207 A1 | 9/2004 | Kim | |
| 2005/0258195 A1 | 11/2005 | Carbone et al. | |

FOREIGN PATENT DOCUMENTS

| | | |
|---|---|---|
| CH | 671749 A5 | 9/1989 |
| DE | 19815364 A1 | 9/1999 |
| DE | 102004056920 A1 | 8/2005 |
| EP | 0442433 A1 | 8/1991 |
| EP | 0517963 A1 | 12/1992 |
| EP | 1500911 A1 | 1/2005 |
| FR | 1338551 | 9/1963 |
| FR | 2643876 A1 | 9/1990 |
| FR | 2702452 A1 | 9/1994 |
| FR | 2747107 A1 | 10/1997 |
| FR | 2800717 A1 | 5/2001 |
| GB | 2089191 A | 6/1982 |
| GB | 2133385 A | 7/1984 |
| GB | 2250271 A | 6/1992 |
| JP | 10291529 A | 11/1998 |
| JP | 2000344243 A | 12/2000 |
| JP | 200119006 A | 1/2001 |
| WO | 9317920 A1 | 9/1993 |
| WO | 9846494 A1 | 10/1998 |
| WO | 0224140 A2 | 3/2002 |
| WO | 02094684 A1 | 11/2002 |
| WO | 03006717 A1 | 1/2003 |
| WO | 03022703 A2 | 3/2003 |
| WO | 2005075314 A2 | 8/2005 |
| WO | 2007142522 A2 | 12/2007 |

* cited by examiner

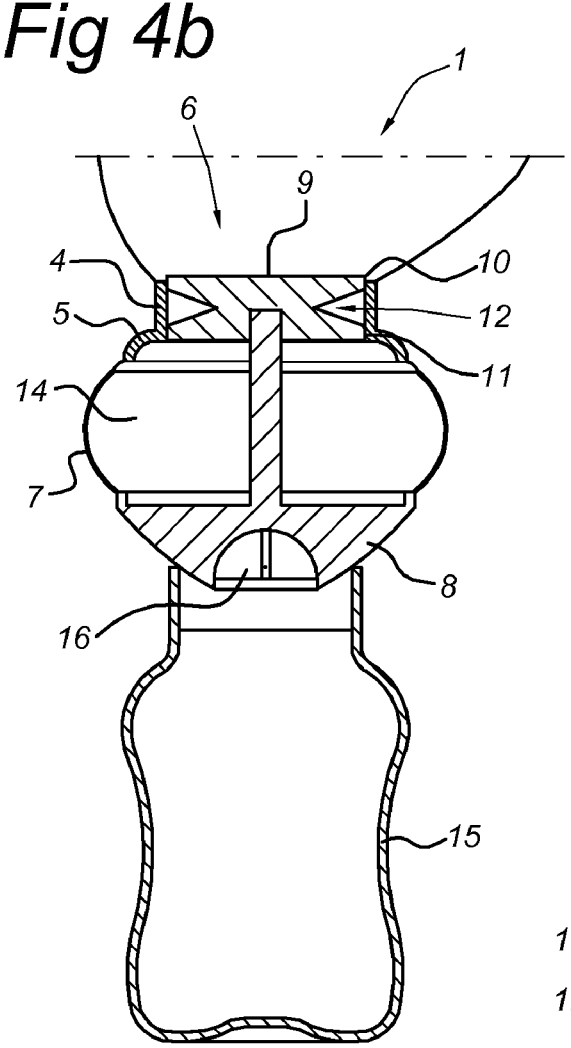
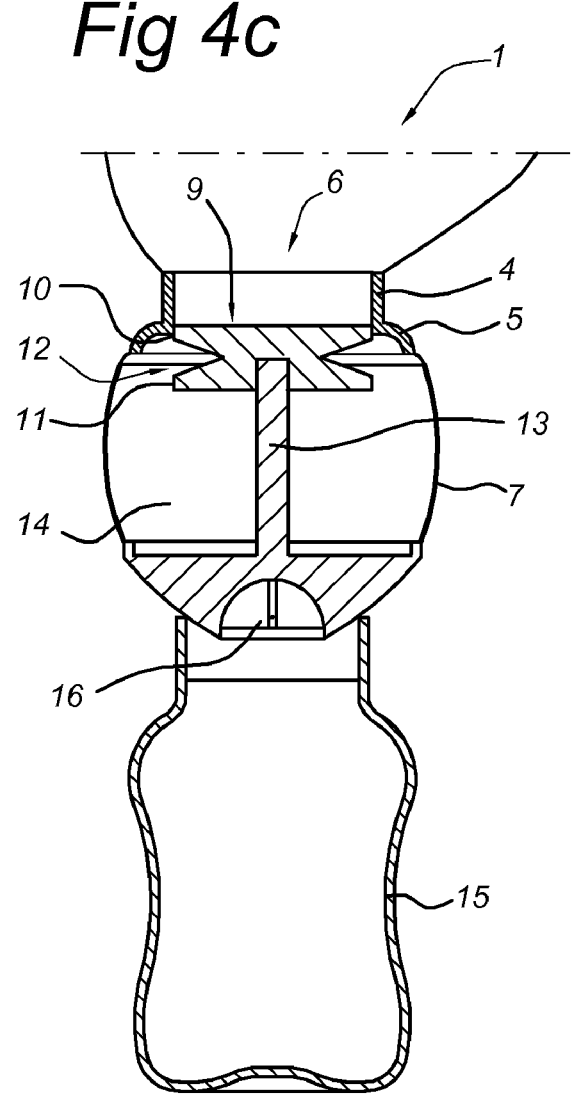

POWDER PACKAGING

BACKGROUND OF THE INVENTION

1. Field of the Invention

The present invention relates to a powder packaging.

2. Description of the Related Art

Applicant has several types of powder packaging concepts described in WO200507531 and WO2007142522. These are successful in the market. These packaging are used by consumers. For accurate dosing of the powder contained in this packaging a spoon is used which is included also included in the packaging. This has several drawbacks, in relation to production, and hygiene when used by consumers. Thus, applicant seeks to improve his known packaging.

Several concepts for dosing powder are based on a laterally shifting part with a powder compartment. This shifting part shifts in an enclosure having a first opening contacting the contents of a container and the powder compartment allowing the powder compartment to fill with powder, and a second opening, often staggered with respect to the first opening, contacting the powder compartment with the outside of the container, allowing the powder compartment to empty when shifted laterally. These concepts are for instance further described in WO0224140, FR2702452, FR2643876, WO02094684. A similar concept is known with a rotating part with a powder compartment, see DE 102004056920.

There are numerous other powder packaging known in the state of the art which include dosing devices. These dosing devices do not meet the tight requirements relating to hygiene, use, accuracy, cost.

SUMMARY OF THE INVENTION

The invention aims to improve known powder packaging.

Another and/or alternative object of the invention is to improve dosing of the contents of known powder packaging.

According to a first aspect of the invention this is realized with a powder packaging comprising a space for containing powder and having an outlet opening for said powder, and a dosing device positioned on said outlet opening, said powder dosing device comprising a dosing body comprising a first closing part, a second closing part and a dosing chamber between said closing parts, said dosing body movable between a filling position in which said dosing chamber is accessible for powder in said powder containing space and said second closing part closes off said outlet opening, and a dosing position in which said first closing part closes off said outlet opening and said dosing chamber allows powder to leave said dosing chamber and thus to exit said powder containing space.

This provides the possibility of providing a dosing device which can be placed on, attached to, or incorporated with a powder packaging. It allows dosing without a consumer having to come in contact with the powder. Especially for infant nutrition, or baby milk, hygienic situation around the preparation of products in a consumer environment is important. The risk of wrong dosages, or foreign objects getting into baby milk needs to be prevented as much as possible. Applicant has gone to great efforts to find a way of dosing which is safe and secure. The dosing body can keep the access to the powder blocked. The dosing chamber guarantees accurate dosing.

In an embodiment of the invention, in said closing position said dosing body is situated at least partly inside said powder containing space with said dosing chamber accessible for powder in said powder containing space.

In an embodiment, in said dosing position said dosing body is situated at least partly outside said powder containing space with said first closing part closing off said outlet opening and said dosing chamber in communication with the outside of said powder containing space, allowing powder in said dosing chamber to leave said dosing chamber and said powder packaging.

In an embodiment, said dosing body when travelling from said filling position to said dosing position travels in axial direction.

In an embodiment, said dosing chamber opens in radial direction.

In an embodiment, said closing parts are substantially in line.

In an embodiment, said dosing device further comprising a closing part comprising wall parts coupled to said outlet opening and positioned to close off said powder chamber of said dosing body when said dosing body is in a position between its filling position and its dosing position.

In an embodiment, said closing part comprises a circumferential wall surrounding said outlet opening, in particular bounding said outlet opening.

In an embodiment, with the distance between the first closing part and the second closing part defined as the dosing body length, the circumferential wall has a height, i.e. the distance between its container end and its dosing end, at least as large as the dosing body length.

In an embodiment, said dosing body has the shape of a diabolo, the central cone part of the diabolo defining the dosing chamber.

In an embodiment, said dosing device further comprises an outlet part opposite said closing part, said outlet part comprising an outlet opening for allowing powder to exit said dosing device, in particular said outlet part comprises an outlet funnel.

In an embodiment, the powder packaging further comprising a flexible circumferential wall connecting said closing part and said outlet part, said closing part, outlet part and said flexible circumferential wall defining a powder space which is in communication with said dosing chamber if said dosing body is in its dosing position, said flexible circumferential wall allowing said closing part and said outlet part to be varied.

In an embodiment, said dosing body is coupled to said outlet part.

In an embodiment, a rod connects said dosing body and said outlet part. The dosing body can thus easily be operated via the stem.

In an embodiment, said dosing body substantially has the outer shape of a cylinder with normal end planes, in particular of a circular or elliptic cylinder. Thus, angles at which dirt can collect are prevented. Furthermore, the rounded shapes contribute to an appealing aspect of the dosing device.

In an embodiment, said dosing chamber has a volume of about 5-50 ml. For baby food, such volumes are commonly used, especially for baby milk.

In an embodiment, said powder packaging comprises a container providing said space for containing powder, and said dosing device, wherein said container and said dosing device are detachable from one another, for instance detachable by screwing or snapping or by manipulating a twist-locking.

In an embodiment, said powder packaging comprises a container having said space for containing powder, and said dosing device, wherein said container and said dosing device fixedly attached onto one another.

The invention further relates to a powder dosing device for positioning on an outlet opening of a powder container, said powder dosing device comprising a dosing body comprising a first closing part, a second closing part and a dosing chamber between said closing parts, said dosing body movable between a filling position in which said dosing chamber is accessible for powder in said powder container and said second closing part closes off said outlet opening, and a dosing position in which said first closing part closes off said outlet opening and said dosing chamber allows powder to leave said dosing chamber and thus to exit said powder containing space.

The invention further relates to an apparatus comprising one or more of the characterising features described in the description and/or shown in the attached drawings. The invention further relates to a method comprising one or more of the characterising features described in the description and/or shown in the attached drawings.

The various aspects discussed in this patent can be combined in order to provide additional advantages. Furthermore, aspects of the description or the claims may form a basis for one or more divisional applications.

BRIEF DESCRIPTION OF THE DRAWINGS

The invention will be further elucidated referring to an embodiment of a powder packaging shown in the attached drawings, showing in:

FIGS. 4*a*-4*c* show three steps in dosing using the embodiment of FIG. 1, showing respectively filling of the powder compartment, an intermediate step, emptying the powder compartment;

DETAILED DESCRIPTION OF EMBODIMENTS

Figure 1:
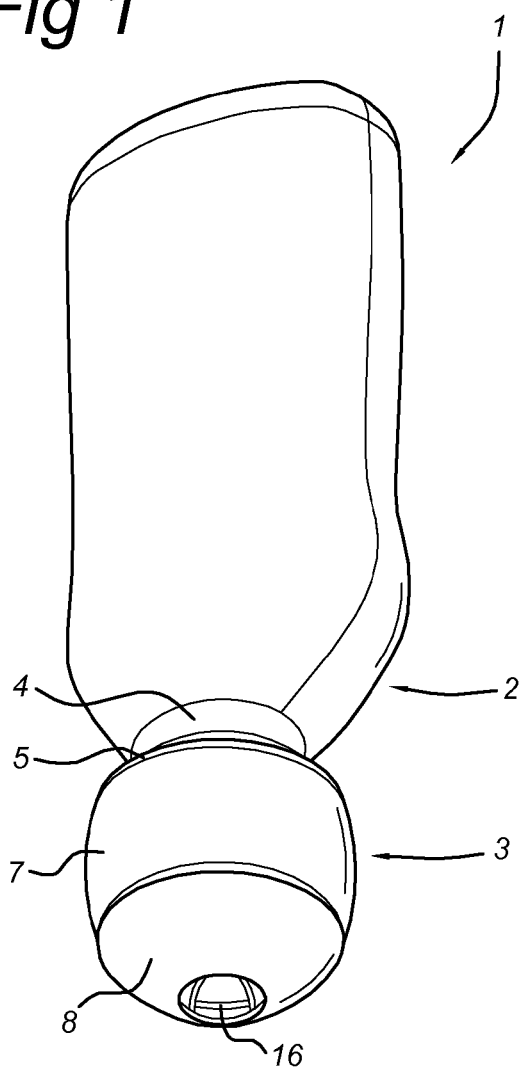
FIG. 1 is a perspective view of a first embodiment of a powder packaging with a dosing device.
Figure 2:
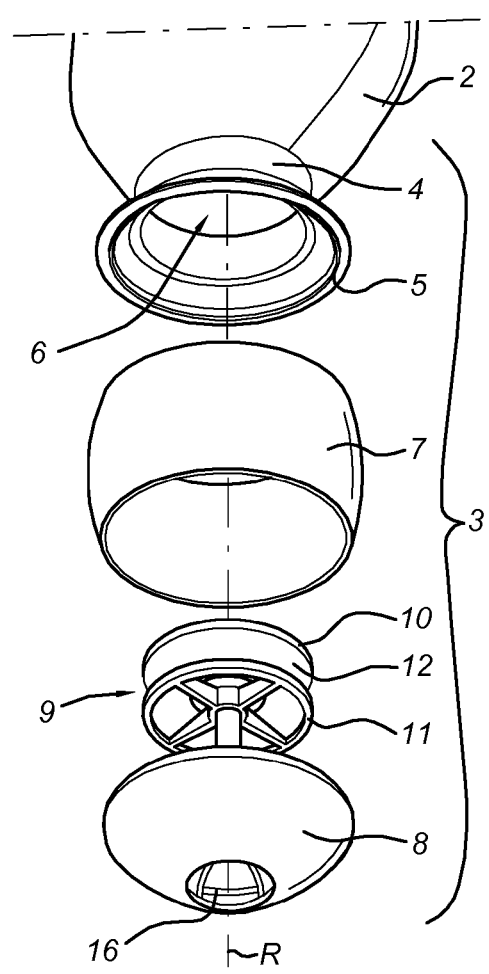
FIG. 2 shows an exploded view of the embodiment of FIG. 1.

In FIG. 1, a perspective view of a powder packaging 1 according to the present invention is shown. It comprises a powder container 2 and a dosing device 3 mounted on an outlet opening of the powder packaging. FIG. 2 shows more details, showing an exploded view of the powder packaging of FIG. 1. In this embodiment the powder container 2 has a ring 4, forming the closing part. On this ring 4 is here removably mounted an flange 5. The flange 5 can be screwed on the ring 4, or may alternatively be snapped on, or attached using a twist-snap fitting. Alternatively, the ring 4 may also form part of the dosing device and the flange 5 can be fixed, or permanently fixed of even co-formed, on the ring 4. It may this in fact form one single part. Such a part can be screwed, snapped or twist-snapped onto the outlet opening 6 of the powder container 2. Usually, the outlet opening, the ring 4 and flange 5 have a round or circular cross section. It may, off course, also be possible to chose another shape of cross section, although round is preferred.

The flange 5 flares out, thus increasing the diameter of the outlet opening 6 of the powder container 2 to a larger diameter to allow powder to flow out easily. Fixed to the largest, outer rim of flange 5 is a flexible ring 7. In this embodiment, this flexible part has two functions. First, it provides a closing ring connecting flange 5 and an outlet part, in this embodiment an outlet funnel 8, of the dosing device 3 to keep powder inside. It is flexible enough to allow this outlet funnel 8 and flange 5 to be moved to one another along their rotational axis. Furthermore, the flexible ring 7 is ridged enough to provide a spring force forcing the flange 5 and the outlet funnel away from one another in the position shown in FIGS. 1 and 2. Furthermore, the material of the flexible ring part allows it to be compressed along its rotational axis without cracking of tearing. The flexible ring 4 usually has a round cross section, but other cross sections can be made, for instance elliptic, or a fantasy shape.

The dosing device 3 further comprises a dosing body 9. Dosing body 9 has a first closing part 10, a second closing part 11, and a dosing chamber 12 provided between the first an second closing part. In this embodiment, it has the shape of a diabolo. The central cone part defines a wedge-shaped dosing chamber, in this embodiment allowing easy filling and emptying. The cross sections of the closing parts 10, 11 are such that they fit into ring 4 in a closing manner. In fact, strictly speaking the cone walls together with the ring 4 actually enclose a chamber. It should be clear that in fact the circumferential wall of ring 4 fits around the closing parts 10 and 11. Thus, they can be elliptic, or even be rectangular or square, although (sharp) corners are better to be avoided because it may prove to be more difficult to prevent leakage.

Figure 3:
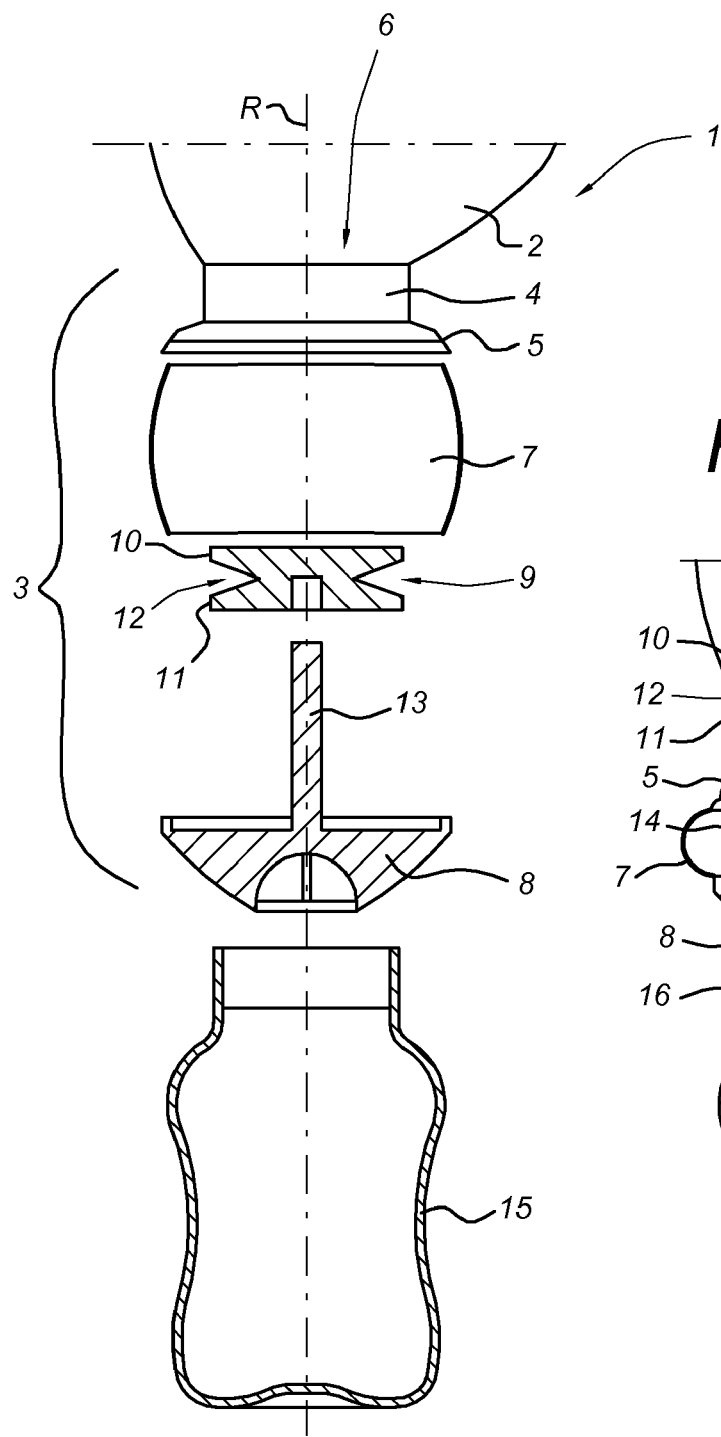
FIG. 3 shows an exploded side view of the embodiment of FIG. 1.

Usually, the volume of the dosing chamber will be about 5-50 ml. For instance, when the dosing device 3 is used on a container for baby milk, the volume will be about 10-15 ml, in particular about 12.5 ml. Other embodiments of the dosing body are conceivable, for instance a very straight-forward embodiment is two spaced apart disks. The space between the disks forming the dosing chamber 12, and the disks forming the two closing parts. The distance between the closing parts 10, 11, the length of dosing body 9, usually is fixed. In an embodiment, it can also be adjustable. In that way, the volume of dosing chamber 12 can be set. In another embodiment, the dosing body 9 is removable from stem 13, as illustrated in FIG. 3. The dosing body 9 can for instance be snapped on or screwed on stem 13. Several dosing bodies can for instance be provided as a set, each dosing body having a different volume in the dosing chamber 12. Thus, the dosing device 3 can be adapted for different types of product, or for instance for babies of different ages.

Figure 6:
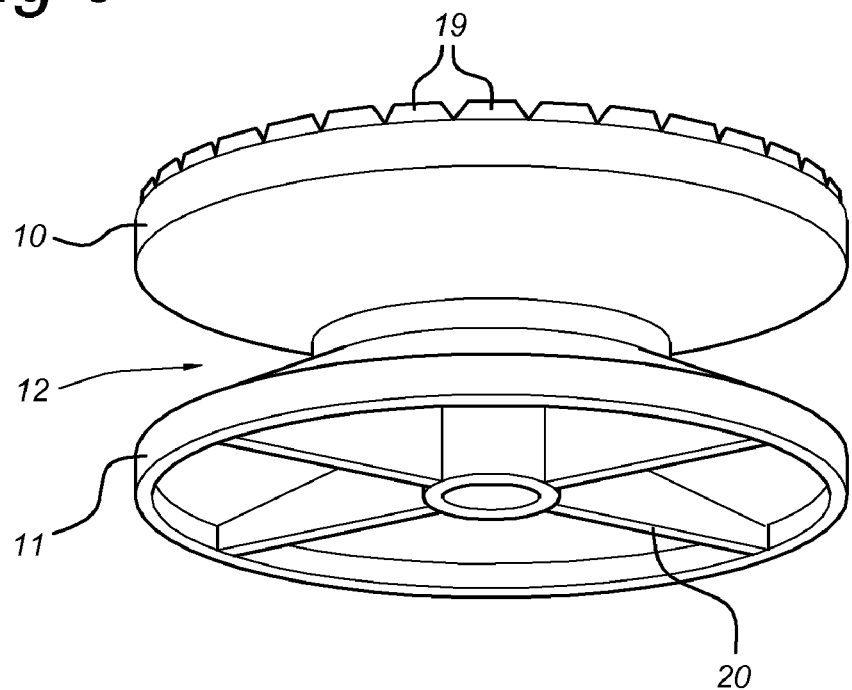
FIG. 6 is a perspective view of an embodiment of a dosing body.

The dosing body 9 is movable in and out of the outlet opening of the powder container. In this embodiment with the ring 4, it is moveable through ring 4. In the embodiment with a round cross section, the dosing body 9 has a rotational axis R and is moveable along, in the sense of in the direction of, this rotational axis. A more detailed perspective view of an embodiment of the dosing body is shown in FIG. 6.

Figure 7:
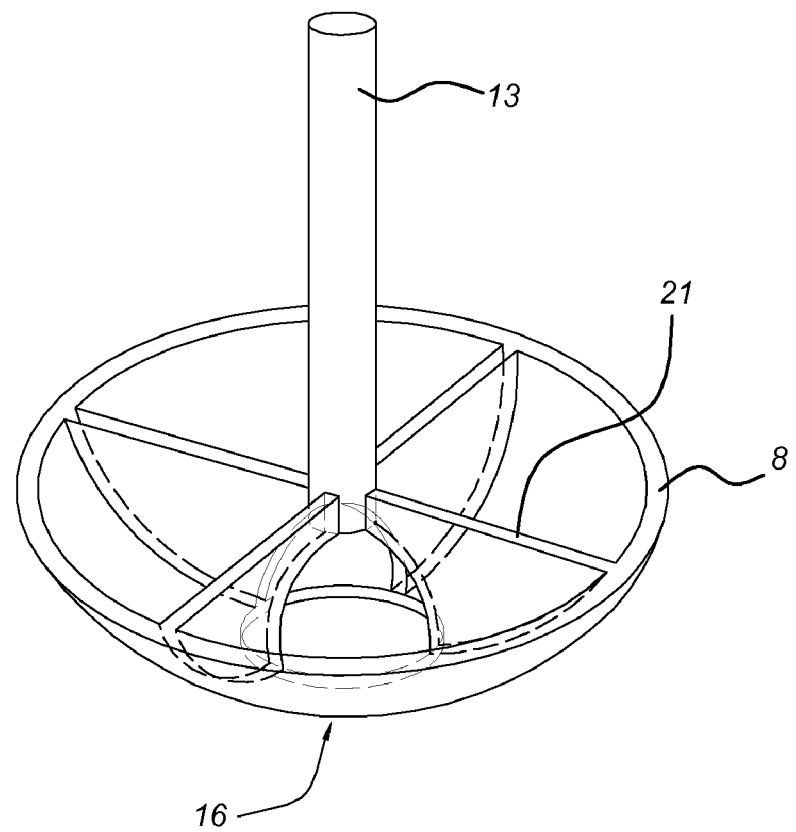
FIG. 7 shows an embodiment of the outlet part.

The dosing body can be coupled to the outlet funnel 8. In this embodiment, the dosing body is coupled to a rod or stem 13. In this embodiment, rod 13 is ridged. Thus, pushing outlet funnel 8 in the direction of the powder container 2, i.e. the direction of the above-mentioned rotational axis of the dosing body 9, will move dosing body 9 in and out the powder container 2. In that way, the dosing chamber 12 is allowed to fill inside the powder container 2 and to empty outside powder container 2. In FIG. 7, an embodiment of the outlet part of the dosing device 3 with outlet funnel 8 and with a rod or stem 13 coupled to it is shown. The rod 13 ends at a distance from outlet opening 16 of the outlet funnel 8 and continues in wall parts 21 connecting the end of rod 13 to outlet funnel 8. Thus, passages are provided for the powder so that it can leave through outlet opening 16.

In this embodiment, flange 5 and outlet funnel 8 are coupled via flexible ring 7. They thus together form a powder receiving space 14 for collecting powder leaving the dosing chamber 12. The flexible ring can be formed as a bellow or concertina part.

Outlet funnel 8 and flange 5 can be (spring) biased away from one another. In this embodiment, the flexible ring 7 provides such a biasing force pushing the outlet funnel 8 and flange 5 away from one another when outlet funnel 8 and flange 5 are brought together by a user. It can also be possible to provide a biasing force holding the outlet funnel and the flange 5 together. Thus, dosing would require pulling them away from one another. It is preferred to design and engineer the biasing force in such a way that in rest, the first closing part 10 closes off a container end of the ring 4, and the second closing part 11 closes off the opposite end of ring 4. In an embodiment, with the distance between the first closing part 10 and the second closing part 11 defined as the dosing body length, the height of the ring, i.e. the distance between its container end and its dosing end, is such that with the dosing body 9 positioned in ring 4, each closing part can close off one end of the ring 4. In an embodiment, the height of ring 4 is at least the length of dosing body 9. In fact, in the embodiment shown, the length of dosing body 9 is about the height of ring 4. Thus, the distance between the dosing position and the filling position is minimal while closing is optimal.

Figure 5A:
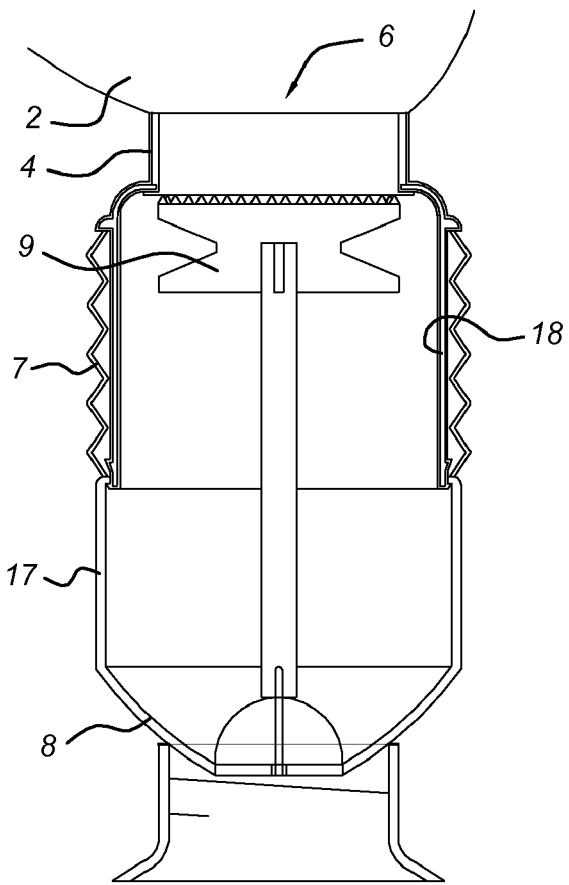
FIGS. 5*a*, 5*b* show an alternative embodiment of a powder packaging with dosing device with the dosing body in filling and dosing position.
Figure 5B:
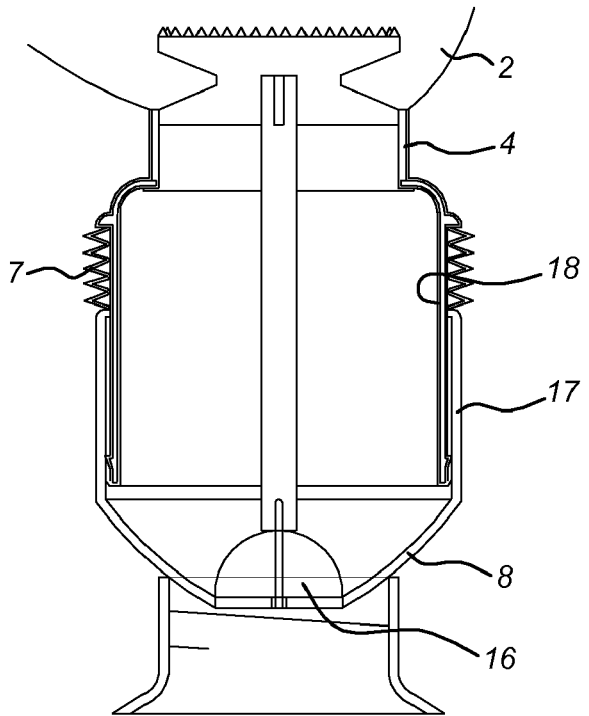

In an alternative embodiment, a spring or other means can be provided for instance on or in rod 13 in order to provide the biasing force. In an alternative embodiment, shown in FIGS. 5A and 5B, flange 5 is coupled to a first ring 18, and outlet funnel 8 to a second ring 17. These two rings 17, 18 can fit one into the other so as to allow one ring to move or slide over the other one. Thus, the rings 17, 18 and outlet funnel 8 and flange 5 together form powder receiving space 14. The two rings can be spring-biased with respect to one another, thus in rest keeping the dosing body in the filling position or in the dosing position. Dosing thus requires (indirectly) pushing the dosing body 9 into the powder-filled container 2, or (indirectly) pulling dosing body 9 out of the powder-filled container 2. Spring-biasing may be done using the already described flexible ring. In FIGS. 5A and 5B the flexible ring is a concertina part. The flexible ring can for instance be made from a plastic material. Suitable plastic materials comprise polypropylene (PP), if needed with additives to make it flexible enough.

The dosing body is usually made from a plastic material. Suitable plastic materials comprise polypropylene (PP) or another, usually food safe material. It can also be made from a biodegradable material.

The closing parts can close off the outlet opening in such a way that powder cannot pass, thus allowing good dosing. It can even be designed and engineered to close off the outlet opening to provided closure of the powder container. It can even be designed and engineered so carefully to seal off the outlet opening. Thus, no further closure of the powder container would be needed. In order to fulfil all food or other safety requirements, outlet funnel 8 can be fitted with a lid or cap. It may also be fitted with a sealing foil, for instance as a tamper-evident or tamper-proof provision. Another way of providing a tamper-evident provision is providing a sealing foil at at least one of the ends of ring 4. Thus, dosing body 9 needs to pierce it. In an embodiment, the sealing foil is provided at the container end of ring 4. Dosing body 9 can be provided with a cutting edge 19 in order to easily penetrate the tamper-evident foil. In a further embodiment, the dosing body 9, or the cutting edge, is formed to hold the foil once it is cut. In FIG. 6, the cutting edge can be seen. To that end, the cutting edge can be inclined inwardly towards the centre of dosing body 9. In another embodiment with removable dosing device, the foil is removed before attaching the dosing device 3 to container 2.

In an embodiment, the dosing device is integrated onto the powder container. In another embodiment, the dosing device can be placed on a separate powder container. Thus, a dosing device can be provided separately from the powder container. It can for instance be screwed on a powder container, or it can be snapped onto a powder container, for instance.

Figure 4A:
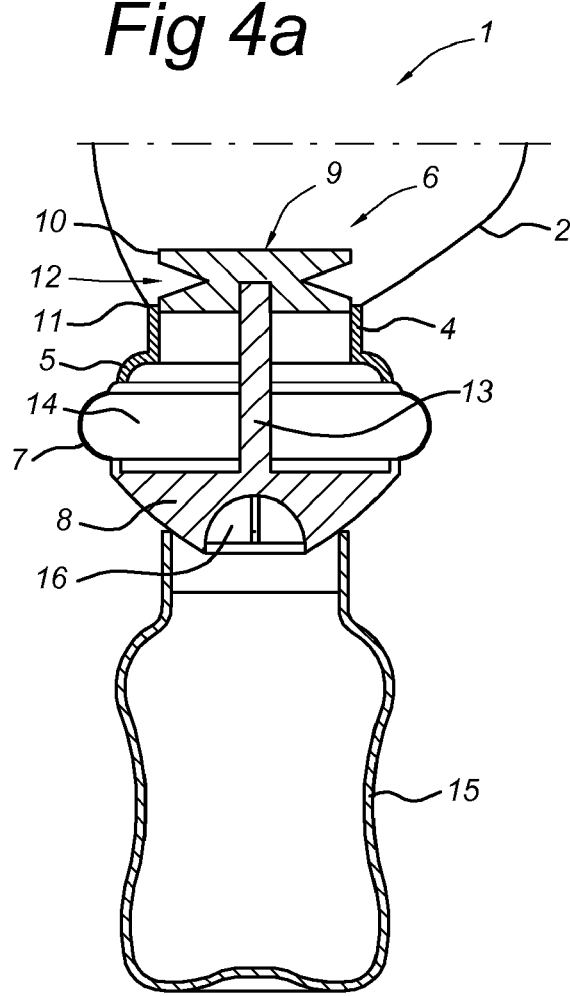

In operation, as shown in steps in FIGS. 4a-4b, the dosing device 3 is operated in the following way. In rest, dosing body 9 is positioned in ring 4 with both closing parts 10, 11 closing off ring 4 (the situation of FIG. 4B), or dosing body 9 is positioned with the first closing part 10 closing off the dosing device end of ring 4 (the situation of FIG. 4C). The packaging is placed on, for instance, a drink bottle 15 upside down. When pushing the packaging 1 on drink bottle 15, dosing body 9 is pressed into the powder containing space of powder container 2, and dosing chamber 12 of dosing body 9 fills with powder. Thus, dosing body 9 is in its filling position. This situation is shown in FIG. 4A. Closing part 11 closes off the container end of ring 4. Next the packaging is released. The dosing body 9 travels to the intermediate position shown in FIG. 4B. This, the dosing volume of the powder is determined or set. Here, in fact the walls of dosing body 9 and the wall of ring 4 enclose dosing chamber 12 and in fact determine its volume. Next, the dosing body travels to its dosing position shown in FIG. 4C. Due to the shape, powder flows out of dosing chamber 12 into powder receiving space 14. There, the dose of powder drops into outlet funnel 8 and leaves the dosing device through opening 16.

The dosing process can also be defined as that outlet funnel 8 and ring 4 are brought together, and as dosing body 9 is coupled to outlet funnel 8, it is brought into the powder containing space. Next, outlet funnel 8 and ring 4 are moved away from one another, and dosing body leaves the powder space, passed ring 4, and at least part of dosing chamber 12 is positioned past the dosing end of ring 4, allowing the powder chamber to empty outside ring 4 and outside powder space. It provides a dose of powder.

It will also be clear that the above description and drawings are included to illustrate some embodiments of the invention, and not to limit the scope of protection. Starting from this disclosure, many more embodiments will be evident to a skilled person which are within the scope of protection and the essence of this invention and which are obvious combinations of prior art techniques and the disclosure of this patent.

The invention claimed is:

1. A powder dosing device for positioning on an outlet opening of a powder containing space, said powder dosing device comprising:
   a dosing body comprising a first closing part, a second closing part and a dosing chamber between said closing parts, said dosing body movable between a filling position in which said dosing chamber is accessible for powder in said powder containing space and said second closing part closes off said outlet opening, and a dosing position in which said first closing part closes off said outlet opening and said dosing chamber allows powder to leave said dosing chamber;
   a circumferential wall connectable to said outlet opening and positioned to close off said powder chamber of said dosing body when said dosing body is in a position between its filling position and its dosing position;

an outlet part opposite said circumferential wall, said outlet part comprising said outlet opening for allowing powder to exit said dosing device; and a flexible wall connecting said circumferential wall and another outlet part, said circumferential wall, outlet part and said flexible wall defining a powder containing space which is in communication with said dosing chamber if said dosing body is in its dosing position, said flexible wall allowing a spacing of said circumferential wall and said outlet part to be varied.

2. The powder dosing device according to claim 1, wherein the dosing device is positioned on said outlet opening of the powder containing space to form a powder packaging.

3. The powder dosing device according to claim 1, wherein in said dosing position said dosing body is situated at least partly inside said powder containing space with said dosing chamber accessible for powder in said powder containing space.

4. The powder dosing device according to claim 1, wherein in said dosing position, said dosing body is situated at least partly outside said powder containing space with said first closing part closing off said outlet opening and said dosing chamber in communication with the outside of said powder containing space, allowing powder in said dosing chamber to leave said dosing chamber and said powder packaging.

5. The powder dosing device according to claim 1, wherein said dosing body when travelling from said filling position to said dosing position travels in an axial direction.

6. The powder dosing device according to claim 5, wherein said dosing chamber opens in a radial direction.

7. The powder dosing device according to claim 5, wherein said closing parts are substantially in line along said axial direction.

8. The powder dosing device according to claim 1, with a distance between the first closing part and the second closing part defined as a dosing body length and the circumferential wall has a height at least as large as the dosing body length.

9. The powder dosing device according to claim 1, wherein said dosing body has the shape of a diabolo, a central cone part of the diabolo defining the dosing chamber.

10. The powder dosing device according to claim 1, wherein said outlet part comprises an outlet funnel.

11. The powder dosing device according to claim 1, wherein said dosing body is coupled to said outlet part.

12. The powder dosing device according to claim 11, wherein a rod connects said dosing body and said outlet part.

13. The powder dosing device according to claim 1, wherein said dosing body substantially has an outer shape of a circular or elliptical cylinder with normal end planes.

14. The powder dosing device according to claim 1, wherein said dosing chamber has a volume of about 5-50 ml.

15. The powder dosing device according to claim 2, wherein said powder packaging comprises a container providing said powder containing space, and said container and said dosing device are detachable from one another by screwing, snapping, or by manipulating a twist-lock.

16. The powder dosing device according to claim 2, wherein said powder packaging comprises a container having said powder containing space, and said container and said dosing device are fixedly attached to one another.

17. A method of dosing infant nutrition in powder form from a powder container into a drink bottle using a dosing device positioned on an outlet opening of the powder container, said method comprising:

providing a dosing device having a dosing body comprising a first closing part, a second closing part and a dosing chamber between said closing parts, a circumferential wall, an outlet part and a flexible wall connecting said circumferential wall with said outlet part, said flexible wall allowing a spacing of said circumferential wall and said outlet part to be varied;

moving said dosing body between a filling position in which said dosing chamber is accessible for powder in said powder container and said second closing part closes off said outlet opening, and a dosing position in which said first closing part closes off said outlet opening and said dosing chamber allows powder to leave said dosing chamber, whereby movement of said dosing body to said filling position takes place by pushing of said outlet part by said drink bottle.

* * * * *